(12) United States Patent
Kim (10) Patent No.: US 10,712,583 B2
(45) Date of Patent: Jul. 14, 2020

(54) POLARIZATION CONTROL PANEL, METHOD OF MANUFACTURING THE SAME, AND STEREOSCOPIC DISPLAY DEVICE USING THE SAME

(71) Applicant: LG Display Co., Ltd., Seoul (KR)

(72) Inventor: Sung-Woo Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 268 days.

(21) Appl. No.: 15/253,439

(22) Filed: Aug. 31, 2016

(65) Prior Publication Data

US 2017/0059876 A1 Mar. 2, 2017

(30) Foreign Application Priority Data

Aug. 31, 2015 (KR) .................. 10-2015-0123050

(51) Int. Cl.
*G02B 30/27* (2020.01)
*G02F 1/1335* (2006.01)
*G02B 30/25* (2020.01)
*G02F 1/1337* (2006.01)
*G02F 1/139* (2006.01)

(52) U.S. Cl.
CPC .............. *G02B 30/27* (2020.01); *G02B 30/25* (2020.01); *G02F 1/133526* (2013.01); *G02F 1/1393* (2013.01); *G02F 1/133784* (2013.01); *G02F 2001/133565* (2013.01); *G02F 2202/28* (2013.01)

(58) Field of Classification Search
None
See application file for complete search history.

(56) References Cited

U.S. PATENT DOCUMENTS

| 6,211,937 | B1* | 4/2001 | Miyachi | G02F 1/13394 |
| | | | | 349/126 |
| 6,266,121 | B1* | 7/2001 | Shigeta | G02F 1/13394 |
| | | | | 349/123 |
| 8,614,771 | B2* | 12/2013 | Hong | G02B 27/2214 |
| | | | | 349/15 |

(Continued)

FOREIGN PATENT DOCUMENTS

| CN | 1797044 A | 7/2006 |
| CN | 101395928 A | 3/2009 |

(Continued)

*Primary Examiner* — Edward J Glick
*Assistant Examiner* — David Y Chung
(74) *Attorney, Agent, or Firm* — Birch, Stewart, Kolasch & Birch, LLP (57) ABSTRACT

A polarization control panel capable of performing two-dimensional (2D) and three-dimensional (3D) control is discussed according to an embodiment. The polarization control panel includes a first substrate and a second substrate opposite to each other, and a first electrode and a second electrode disposed respectively on the first and second substrates. The polarization control panel further includes a lens layer disposed on the first electrode, the lens layer having a surface curved toward the second electrode, and the curved surface being rubbed in a first direction. The polarization control panel further includes an adhesive layer disposed on the second electrode and rubbed in a second direction, and an optically anisotropic layer disposed between the adhesive layer and the lens layer.

24 Claims, 9 Drawing Sheets

(56) References Cited

U.S. PATENT DOCUMENTS

| | | | | |
|---|---|---|---|---|
| 8,741,397 B2* | 6/2014 | Hattori | ............... | C08F 2/50 252/299.4 |
| 2006/0125977 A1* | 6/2006 | Park | ............... | G02B 3/005 349/95 |
| 2007/0019132 A1* | 1/2007 | Kim | ............... | B29C 43/021 349/95 |
| 2008/0013002 A1* | 1/2008 | Hong | ............... | G02B 3/12 349/15 |
| 2008/0252639 A1* | 10/2008 | Ijzerman | ............... | H04N 13/305 345/419 |
| 2009/0033812 A1* | 2/2009 | Ijzerman | ............... | G02B 27/2214 349/15 |
| 2009/0316097 A1* | 12/2009 | Presniakov | ............... | G02F 1/29 349/129 |
| 2013/0101755 A1* | 4/2013 | Lee | ............... | G02F 1/133707 428/1.23 |
| 2013/0107174 A1* | 5/2013 | Yun | ............... | G02F 1/133526 349/96 |
| 2014/0022479 A1* | 1/2014 | Hosaka | ............... | G02F 1/133512 349/43 |
| 2014/0029087 A1 | 1/2014 | Yoon et al. | | |
| 2014/0049706 A1* | 2/2014 | Park | ............... | G02B 27/22 349/15 |
| 2014/0104545 A1* | 4/2014 | Miyazawa | ............... | G02F 1/133528 349/96 |
| 2014/0176833 A1* | 6/2014 | Wu | ............... | G02B 27/26 349/15 |
| 2015/0077670 A1* | 3/2015 | Son | ............... | G02B 27/2214 349/33 |
| 2016/0187760 A1* | 6/2016 | Kim | ............... | G02F 1/29 349/139 |

FOREIGN PATENT DOCUMENTS

| | | | | |
|---|---|---|---|---|
| CN | 104115052 A | 10/2014 | | |
| KR | 10-2013-0064333 A | 6/2013 | | |
| WO | WO 2013104519 A1 * | 7/2013 | ......... | G02B 27/2214 |

* cited by examiner

POLARIZATION CONTROL PANEL, METHOD OF MANUFACTURING THE SAME, AND STEREOSCOPIC DISPLAY DEVICE USING THE SAME

CROSS-REFERENCE TO RELATED APPLICATIONS

This application claims priority from and the benefit under 35 U.S.C. § 119(a) of Korean Patent Application No. 10-2015-0123050, filed on Aug. 31, 2015, which is hereby incorporated by reference as if fully set forth herein.

BACKGROUND OF THE INVENTION

Field of the Invention

The present invention relates to a stereoscopic display device, and more particularly to a polarization control panel that is capable of performing two-dimensional (2D)/three-dimensional (3D) control through the application of voltage and of orienting an optically anisotropic layer without using an orientation film, a method of manufacturing the same, and a stereoscopic display device using the same.

Discussion of the Related Art

Generally, a stereoscopic image, i.e. a 3D image, is obtained based on the principle of stereo vision using two eyes. The left eye and the right eye view slightly different images due to the distance between the two eyes, which is about 65 mm. The difference between the images due to the distance between the two eyes is called binocular disparity. A 3D stereoscopic display device enables the left eye to view an image intended for the left eye and the right eye to view an image intended for the right eye using such binocular disparity.

That is, the left and right eyes view different 2D images. The two images are transmitted to the brain via the retinas. The brain correctly merges the images to reproduce the depth and realism of the 3D image. This ability is generally called stereography. A device that implements the stereography is a stereoscopic display device.

The stereoscopic display device may be classified as a glasses type device or a non-glasses type device.

In the glasses type stereoscopic display device, left and right images are spatially divided and displayed or left and right images are temporally divided and displayed. In the glasses type device, however, a viewer must wear glasses in order to view a 3D image. For this reason, the non-glasses type stereoscopic display device has been proposed as an alternative.

In the non-glasses type stereoscopic display device, an optical device, such as a parallax barrier or a lenticular lens, for separating the optical axes of the left-eye and right-eye images is mounted at the front or rear of a display screen to realize a 3D image.

However, the lenticular lens is made of a material having a single refractive index, and the position of the parallax barrier is fixed. In the non-glasses type stereoscopic display device, therefore, a 3D image is displayed but conversion to a 2D image is not possible.

SUMMARY OF THE INVENTION

Accordingly, the present invention is directed to a polarization control panel, a method of manufacturing the same, and a stereoscopic display device using the same that substantially obviate one or more problems due to limitations and disadvantages of the related art.

An object of the present invention is to provide a polarization control panel that is capable of performing 2D/3D control through the application of voltage and of orienting an optically anisotropic layer without using an orientation film, a method of manufacturing the same, and a stereoscopic display device using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

A polarization control panel according to the present invention is characterized in that an adhesive layer adhered to upper and lower substrates is rubbed to define the orientation of the adhesive layer, and an optically anisotropic layer is oriented through the adhesive layer, whereby an additional orientation film is obviated.

To achieve these objects and other advantages and in accordance with the purpose of the invention, as embodied and broadly described herein, a polarization control panel includes a first substrate and a second substrate opposite to each other, a first electrode and a second electrode provided respectively on the first and second substrates, a lens layer provided on the first electrode, the lens layer having a surface curved toward the second electrode, the curved surface being rubbed in a first direction, an adhesive layer provided on the second electrode, the adhesive layer being rubbed in a second direction, the adhesive layer being adhered to the uppermost part of the lens layer, and an optically anisotropic layer disposed between the adhesive layer and the lens layer.

In another aspect of the present invention, a method of manufacturing a polarization control panel includes providing a first electrode on a first substrate, forming a lens layer having a regularly curved surface on the first electrode, rubbing the surface of the lens layer in a first direction, providing a second electrode on a second substrate, forming an adhesive layer on the second electrode, rubbing the adhesive layer in a second direction, forming a side seal on the adhesive layer so as to enclose the edge of an active area, forming an optically anisotropic layer between lenses of the lens layer, and laminating the first substrate and the second substrate via the side seal such that the adhesive layer and the lens layer face each other.

In a further aspect of the present invention, a stereoscopic display device includes the polarization control panel with the above-stated construction and a display panel attached to the polarization control panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may obscure the subject matter of the present invention. In addition, the terms used in the following description are selected in consideration of the ease of preparation of the specification, and may be different from the names of parts constituting a real product.

Generally, a lenticular lens or a parallax barrier is used to divide an image into a left-eye image and a right-eye image. However, light is blocked by the parallax barrier with the result that the luminance of the light is reduced. For this reason, the lenticular lens is preferred.

Hereinafter, a description will be given of a polarization control panel, including a lenticular lens that is capable of dividing an image into a left-eye image and a right-eye image in a 3D display mode and of serving as a transparent film in a 2D display mode.

First Embodiment

Figure 1:
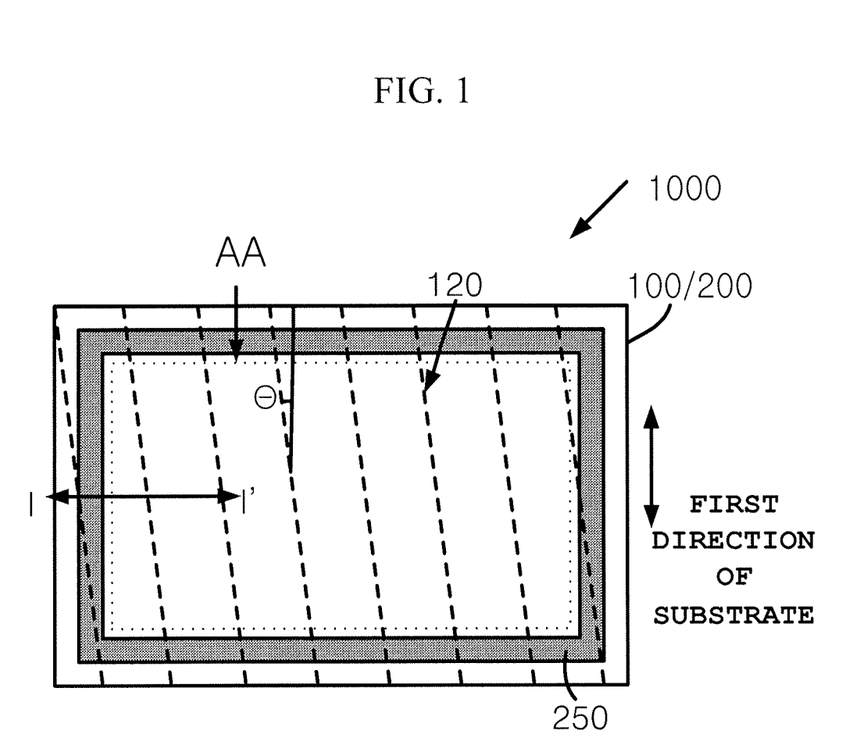
FIG. 1 is a plan view showing a polarization control panel according to a first embodiment of the present invention.
Figure 2:
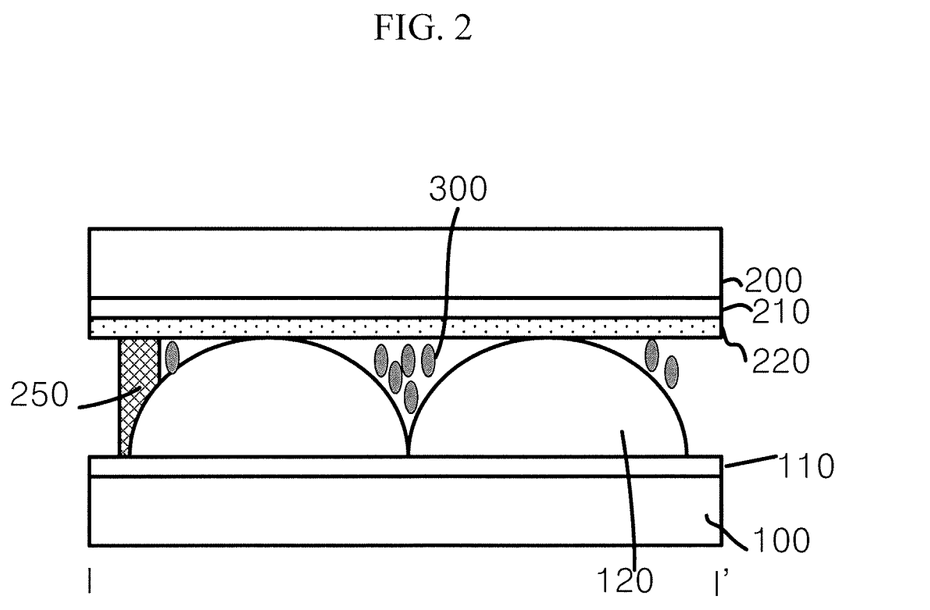
FIG. 2 is a sectional view of FIG. 1 according to I~I' line.
Figure 3A:
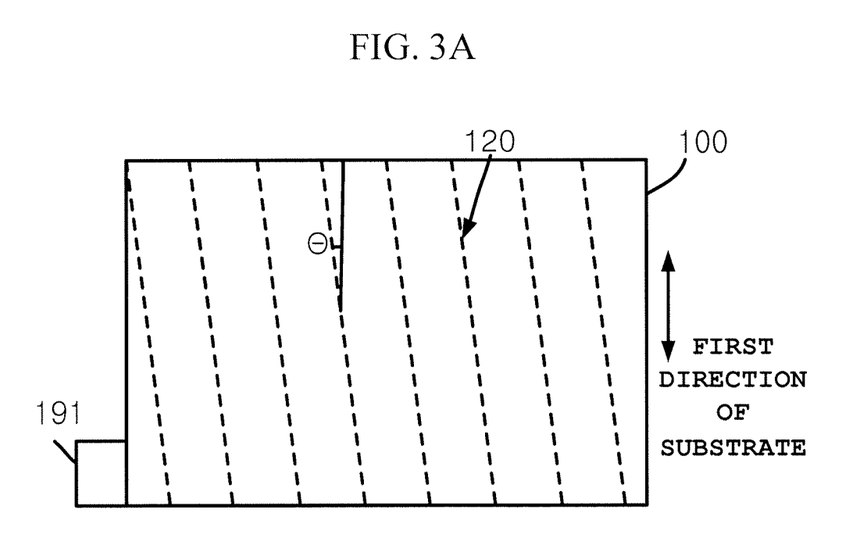
FIGS. 3A and 3B are plan views respectively showing the structure of the polarization control panel of FIG. 1 on the lower substrate side and on the upper substrate side.
Figure 3B:
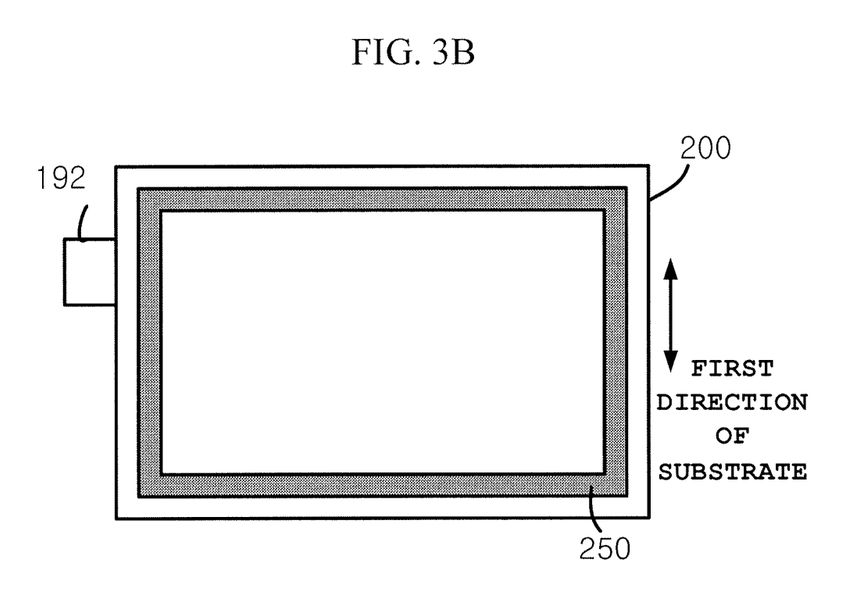

FIG. 1 is a plan view showing a polarization control panel according to a first embodiment of the present invention, and FIG. 2 is a sectional view of FIG. 1. FIGS. 3A and 3B are plan views respectively showing the structure of the polarization control panel of FIG. 1 on the lower substrate side and on the upper substrate side.

As shown in FIGS. 1 and 2, a polarization control panel 1000 according to the present invention includes a first substrate 100 and a second substrate 200 opposite to each other, a first electrode 110 and a second electrode 210 provided respectively on the first and second substrates 100 and 200, a lens layer 120 provided on the first electrode 110, the lens layer 120 having a surface curved toward the second electrode 210, the curved surface being rubbed in a first direction, an adhesive layer 220 provided on the second electrode 210, the adhesive layer 220 being rubbed in a second direction, the adhesive layer 220 being adhered to the uppermost part of the lens layer 120, and an optically anisotropic layer 300 disposed between the adhesive layer 220 and the lens layer 120.

The first and second substrates 100 and 200 are made of a plastic film. The first and second substrates 100 and 200 each have a thickness of 10 μm to 500 μm. The first and second substrates 100 and 200 are flexible and transparent. Generally, the thickness of the plastic film may be small. In the case in which the plastic film is provided on a display panel as a polarization optical element, the thickness of the plastic film may be intentionally increased when it is necessary to adjust the rear distance based on the size of the display panel. The first and second substrates 100 and 200, which account for most of the thickness of the polarization control panel 1000, are each made of a plastic film, which is flexible, instead of a conventional glass material. In the case in which the polarization control panel is provided on a flexible display panel, the flexibility of the display device is improved. For example, the first and second substrates 100 and 200 may each be made of at least one polymer selected among polyethylene or a copolymer including polyethylene, polyester or a copolymer including polyester, polyimide or a copolymer including polyimide, an olefin copolymer, polyacrylic acid or a copolymer including polyacrylic acid, polystyrene or a copolymer including polystyrene, polysulfate or a copolymer including polysulfate, polycarbonate or a copolymer including polycarbonate, polyamic acid or a copolymer including polyamic acid, polyamine or a copolymer including polyamine, polyvinylalcohol, and polyallylamine.

The first and second substrates 100 and 200 may be made of the same material or different materials. However, the first and second substrates 100 and 200 have something in common with each other in that the first and second substrates 100 and 200 are flexible, have a uniaxial refractive index, and extend in the uniaxial direction. When the polarization control panel 1000 is attached to the display panel, the first and second substrates 100 and 200 are aligned with the transmission axis of a polarization plate located on the uppermost surface of the display panel.

Meanwhile, as shown in FIG. 1, the first and second substrates 100 and 200 may have the same rectangular shape. In order to apply voltages to the first electrode 110 and the second electrode 210, as shown in FIGS. 3A and 3B, the first and second substrates 100 and 200 may each have a first dummy region 191 protruding from a portion of one side thereof and a second dummy region 192 protruding from a portion of one side thereof. In this case, the first and second substrates 100 and 200 extend respectively to the first and second dummy regions 191 and 192, and the first electrode 110 and the second electrode 210 extend respectively to the first and second dummy regions 191 and 192. The protruding first and second dummy regions 191 and 192 may be connected to a flexible printed circuit (FPC), including a voltage application unit, such that external voltage signals are applied to the first electrode 110 and the second electrode 210. However, the provision of the first and second dummy regions 191 and 192 is merely an example. Portions of the outer regions of the first and second substrates 100 and 200 may be used as regions for connection with the FPC such that external voltage signals are applied to the first electrode 110 and the second electrode 210 through the outer regions thereof. In addition, a plurality of first and second dummy regions 191 and 192 may be provided so as to stabilize the voltages applied to the respective electrodes 110 and 210.

The first and second electrodes 110 and 210 may be transparent electrodes made of indium tin oxide (ITO), indium zinc oxide (IZO), or indium tin zinc oxide (ITZO). The first and second electrodes 110 and 210 may be formed respectively on the first and second substrates 100 and 200 by sputtering. Alternatively, the first and second electrodes 110 and 210 may each be formed in a film shape such that the first and second electrodes 110 and 210 are formed on the first and second substrates 100 and 200 by lamination. In the polarization control panel 1000 according to the present invention, the first and second substrates 100 and 200 are each made of a plastic film. Consequently, the respective layers may be easily formed by placing different film-forming materials between adjacent film-forming rollers.

The lens layer 120 is made of a photo-curable resin. For example, the lens layer 120 may be made of a material that is hardened by UV radiation, such as photo acryl. In addition, the lens layer 120 may include a thermally reactive monomer such that the lens layer 120 is rubbed by physical pressure during pre-baking at a temperature of 60° C. to 70° C. even after UV radiation.

The lens layer 120 may have a curved surface, in which a parabola shape, an aspheric shape, or a portion of a spherical shape including a semicircular shape is periodically repeated in section. For example, the curved surface of the lens layer may have a convex lens shape from the first electrode 110 to the adhesive layer 220 or a concave lens shape from the adhesive layer 220 to the first electrode 110.

The optically anisotropic layer 300 is disposed in an active area between the adhesive layer 220 and the lens layer 120.

The optically anisotropic layer 300 has different biaxial refractive indices ne and no, as in liquid crystals or reactive mesogen. The major-axis refractive index ne is greater than the minor-axis refractive index no (ne>no).

The lens layer 120 has a uniaxial refractive index, which is equal to the major-axis refractive index ne of the optically anisotropic layer 300. When no voltages are applied to the first and second electrodes 110 and 210, the optically anisotropic layer 300 has only the major-axis refractive index ne. As a result, light passes through the polarization control panel 1000 from the lower side. In this case, the polarization control panel 1000 functions as a transparent film. When different voltages are applied to the first and second electrodes 110 and 210, a vertical electric field is formed between the first and second electrodes 110 and 210. As a result, the optically anisotropic layer 300 has the minor-axis refractive index no. Due to an anisotropic refractive index n (n=ne−no), which is the difference between the major-axis refractive index and the minor-axis refractive index of the optically anisotropic layer 300, light having passed through the lens layer 120 from the lower side is refracted by the interface between the lens layer 120 and the optically anisotropic layer 300, whereby an image corresponding to the left eye and an image corresponding to the right eye may be separated from each other.

In the polarization control panel 1000 according to the present invention, out of the lens layer 120 and the optically anisotropic layer 300, by which the thickness between the first and second substrates 100 and 200 is set, the lens layer 120, which is convex and has a large volume, is made of material having a single refractive index, and an optically anisotropic material is filled in the rest, whereby the use of expensive birefringent material can be considerably reduced.

Meanwhile, the adhesive layer 220 of the present invention mainly includes an acrylic-based polymer. In addition, the adhesive layer 220 may further include an epoxy-based polymer. The acrylic-based polymer and/or the epoxy-based polymer is the main ingredient of the adhesive layer 220. The adhesive layer 220 may include a small amount of photo or thermal initiator or other types of polymer as an accessory ingredient.

In addition, the above-mentioned adhesive layer is itself a sheet type, and a sheet type adhesive layer 220 may be formed on the front surface of the second electrode 210 by lamination. Alternatively, a liquid type adhesive layer 220 may be coated over the second electrode 210 and may be pre-baked at a temperature of 60° C. to 70° C. for a predetermined time such that the thickness of the adhesive layer 220 is uniform.

The adhesive layer 220 may be rubbed to define the direction of orientation of the optically anisotropic layer 300 at the initial state.

The adhesive layer 220 has a uniaxial refractive index of 1.48 to 1.68, which is similar to the refractive index of the lens layer 120.

The adhesive layer 220, through rubbing on its surface and curing process, can function as both an alignment film and an adhesive layer, whereby the use of the alignment film in the polarization control panel 1000 may be omitted, and the adhesion between the adhesive layer 220 and the lens layer 120 may be improved through the curing process of the adhesive layer 220.

Meanwhile, the lens layer 120, which is opposite to the adhesive layer 220, is rubbed. Rubbing directions of the adhesive layer 220 and the lens layer 120 are anti-parallel to each other. The rubbing directions of the adhesive layer 220 and the lens layer 120 may be defined based on the optical axis of the display panel, on which the polarization control panel 1000 is placed.

The adhesive layer 220 and the lens layer 120 are laminated after the optically anisotropic layer 300 is filled between the adhesive layer 220 and the lens layer 120. During or after lamination, the adhesive layer 220 and the lens layer 120 are thermally hardened at a temperature of 70° C. to 80° C. for 4 to 48 hours such that the uppermost parts of the adhesive layer 220 and the lens layer 120 are adhered to each other. In this case, the adhesion between the adhesive layer 220 and the lens layer 120 may be improved by the weight of the components of the polarization control panel 1000 on the second substrate 200 or by the application of additional pressure. The adhesive layer 220 and the lens layer 120 may be adhered in surface contact over a predetermined area, rather than in point contact, in section, by the weight of the components of the polarization control panel 1000 on the second substrate 200 or by the application of additional pressure, whereby the adhesion between the adhesive layer 220 and the lens layer 120 is improved.

An active area is defined at the center of the first substrate 100 and the second substrate 200. The active area is filled with the optically anisotropic layer 300 such that 2D/3D control is possible based on the change of refractive index of the optically anisotropic layer 300. In addition, a closed-loop shaped side seal 250 is provided to enclose the optically anisotropic layer 300. The side seal 250 contains an epoxy-based material. The upper side of the side seal 250 contacts the adhesive layer 220, and the lower side of the side seal 250 contacts the first electrode 110 or the lens layer 120. The reason that the lower side of the side seal 250 may contact a different member is that the curved surface of the lens layer 120 may be located within the active area or the curved surface of the lens layer 120 may extend to the outer regions of the first and second substrates 100 and 200. Since the optically anisotropic layer 300 is located only within the active area, the optically anisotropic layer 300 performs the same operation irrespective of whether an electric field is applied. Functionally, therefore, there is no difference between the case in which the lens layer 120 contacts the side seal 250 and the case in which the first electrode 110 contacts the side seal 250, in the outer regions of the first and second substrates 100 and 200.

Meanwhile, the optically anisotropic layer 300 may be realized by a liquid crystal layer including nano liquid crystal capsules and a binder disposed among the nano liquid crystal capsules, rather than a liquid type optically anisotropic layer. In this case, the liquid crystal layer including the nano liquid crystal capsules may be of a film type, whereby the polarization control panel 1000 may be manufactured in the state in which the side seal 250 is omitted.

In the polarization control panel 1000, the first and second substrates 100 and 200 may have the largest thicknesses. The first and second substrates 100 and 200 may each have a thickness of about 10 to 300 μm, the first and second electrodes 110 and 210 may each have a thickness of about 100 Å to 2 μm, the lens layer 120 and the optically anisotropic layer 300 may each have a thickness of about 1 to 100 μm. The polarization control panel 1000 may be flexible. Consequently, a film type polarization control panel 1000 may be attached to a thin flexible display to have a 3D control function without compromising the flexibility thereof.

The polarization control panel 1000 selectively controls a 2D display mode and a 3D display mode.

In the 2D display mode in which no voltages are applied to the first and second electrodes 110 and 210, there is no difference in refractive index when light passes through the lens layer 120 and the optically anisotropic layer 300 from the lower side. As a result, the light passes directly through the lens layer 120 and the optically anisotropic layer 300 with no difference in refractive index at the interface between the lens layer 120 and the optically anisotropic layer 300, whereby the polarization control panel 1000 functions as a transparent film.

In the 3D display mode, different voltages are applied to the first and second electrodes 110 and 210, such that a vertical electric field is formed between the first and second electrodes 110 and 210. At this time, the arrangement of the anisotropic material in the optically anisotropic layer 300 is changed. As a result, the light passes through the lens layer 120 and the optically anisotropic layer 300 in the state of being refracted due to the anisotropic refractive index n at the interface between the lens layer 120 and the optically anisotropic layer 300, whereby a viewer may feel an effect in which the left-eye image and the right-eye image are separated from each other.

Meanwhile, as shown in FIGS. 1 and 3, the lens layer 120 is tilted by an angle θ with respect to the first direction (the vertical direction) of the first substrate 100. The tilt angle may be changed based on the conditions of views to be displayed and the relationship between the pitch of the pixels provided on the display panel and the pitch of the unit lenses of the lens layer 120. In the case in which two views are displayed and the pitch of the unit lenses of the lens layer 120 is identical to the pitch of the pixels provided on the display panel, the angle θ may be 0 degrees.

That is, in the polarization control panel 1000 according to the present invention, the optically anisotropic layer may be aligned without having a separate alignment layer in the polarization control panel by rubbing the adhesive layer and the lens layer. Consequently, since the process of forming the alignment film and the use of a material for the alignment film may be obviated, it is possible to simplify the process and to minimize the use of materials.

Second Embodiment

Figure 4:
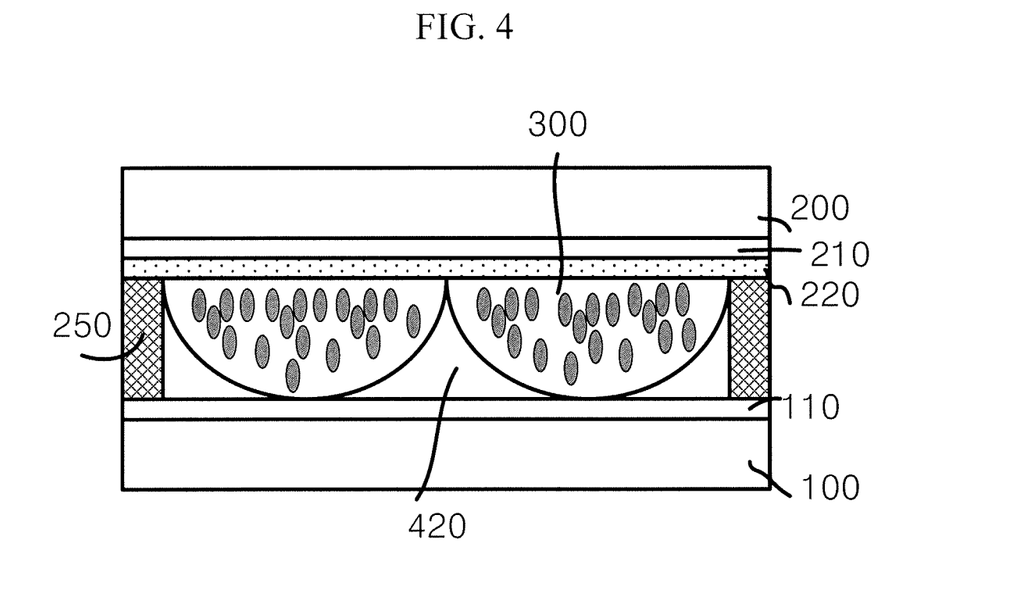
FIG. 4 is a plan view showing a polarization control panel according to a second embodiment of the present invention.

FIG. 4 is a plan view showing a polarization control panel according to a second embodiment of the present invention.

The polarization control panel according to the second embodiment of the present invention shown in FIG. 4 is identical to the polarization control panel according to the first embodiment of the present invention except that the shape of a lens layer 420 is reversed. Parts having the same reference numerals have the same functions, and a description thereof will be omitted.

As shown in FIG. 4, the lens layer 420 has a concave lens shape. The curved surface of the lens layer is configured such that periodic repetition of an aspheric shape, a parabola shape, or a portion of a spherical shape including a semicircular shape is omitted from a flat layer having a predetermined thickness in section.

In this case, the optically anisotropic layer 300 is filled between the adhesive layer 220, the lens layer 420 and the side seal 250. Compared with the first embodiment, the optically anisotropic layer 300 and the lens layer 420 of the second embodiment may correspond respectively to the lens layer and the optically anisotropic layer of the first embodiment.

Figure 5A:
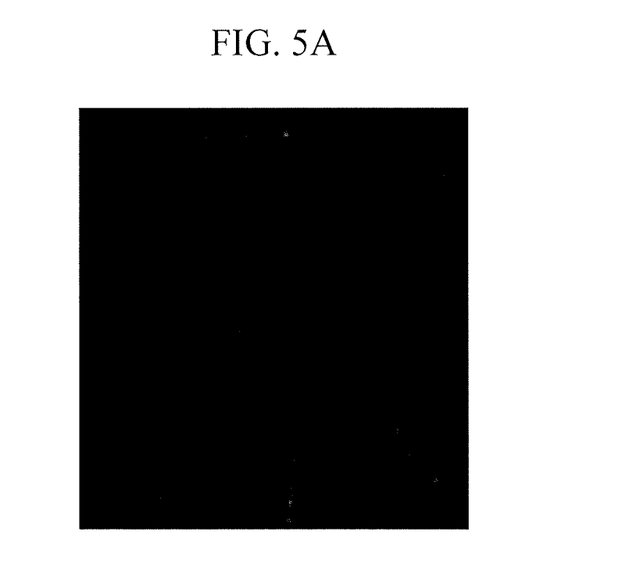
FIGS. 5A and 5B are optical photographs respectively showing the upper surface of the polarization control panel of FIG. 1 in a black state when orientation processing is applied and when orientation processing is not applied.
Figure 5B:
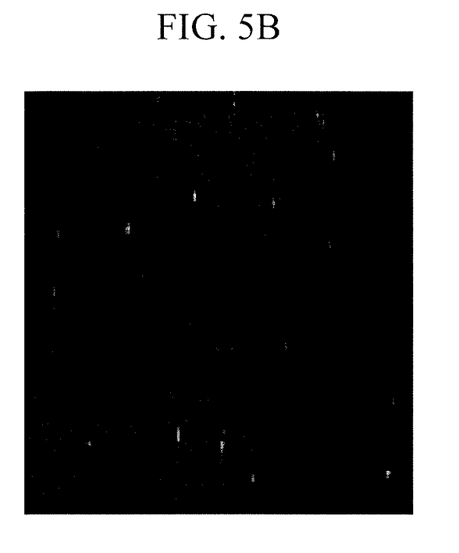

FIGS. 5A and 5B are optical photographs showing the upper surface of the polarization control panel in a black state when the adhesive layer is provided and when no adhesive layer is provided, respectively.

FIG. 5A shows the polarization control panel according to the present invention shown in FIG. 1, whereas FIG. 5B shows the polarization control panel having no adhesive layer.

As shown in FIGS. 5A and 5B, the lens layer and the optically anisotropic layer 300 are provided between the first substrate and the second substrate, both of which have electrodes.

As shown in FIG. 5A, if the adhesive layer is provided and rubbed, implementation of the black state is normally displayed. However, if no adhesive layer is provided, as shown in FIG. 5B, there is a lifting between the upper/lower substrates and the optically anisotropic layer, such that light leaks between the lens layer and the optically anisotropic layer.

Although the side seal is provided, surface-to-surface adhesion is not achieved. In the present invention, the adhesion layer is provided between the lens layer/the optically anisotropic layer and the second electrode, and the adhesion layer is rubbed to secure the initial orientation of the optically anisotropic layer in a stable manner.

Figure 6:
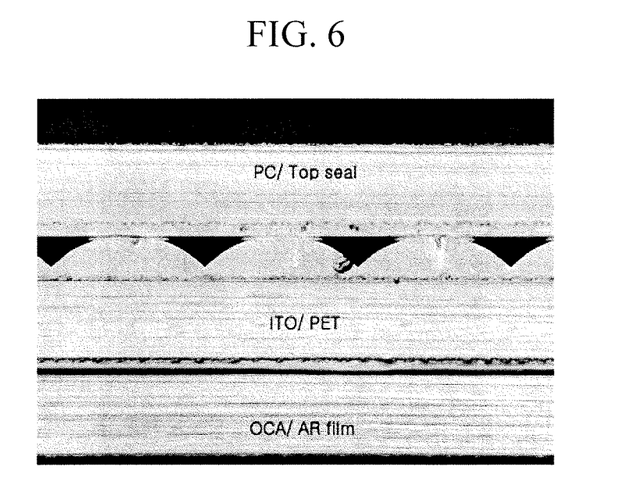
FIG. 6 is a scanning electron microscopy (SEM) view showing the section of the polarization control panel according to the first embodiment of the present invention.

FIG. 6 is a scanning electron microscopy (SEM) view showing the cross-section of the polarization control panel according to the first embodiment of the present invention.

As shown in FIG. 6, in the polarization control panel according to the first embodiment of the present invention, the adhesive layer is provided on the uppermost part of the second substrate, the adhesive layer is adhered to the lens layer and the optically anisotropic layer, and surface contact between the lens layer and the adhesive layer is sufficiently achieved by going through the process of thermal hardening and applying pressure after lamination of the first and second substrates, whereby separation of the first and second substrates is prevented.

Hereinafter, a method of manufacturing the polarization control panel according to the present invention will be described with reference to the drawings.

Figure 7A:
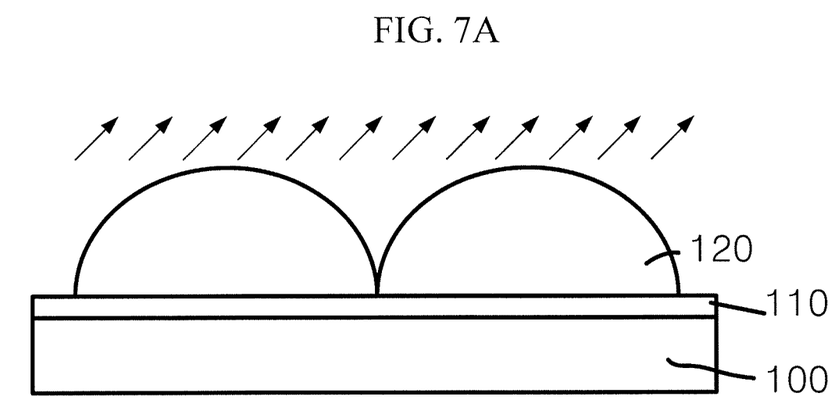
FIGS. 7A and 7B are plan views respectively showing rubbing of the polarization control panel according to the present invention on the lower substrate side and on the upper substrate side.
Figure 7B:
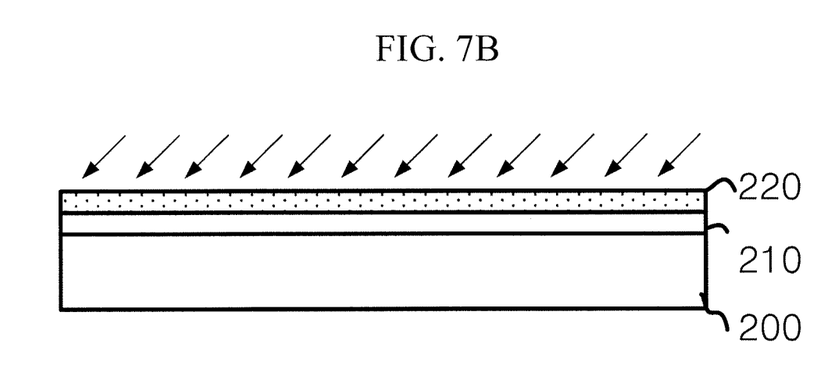
Figure 8:
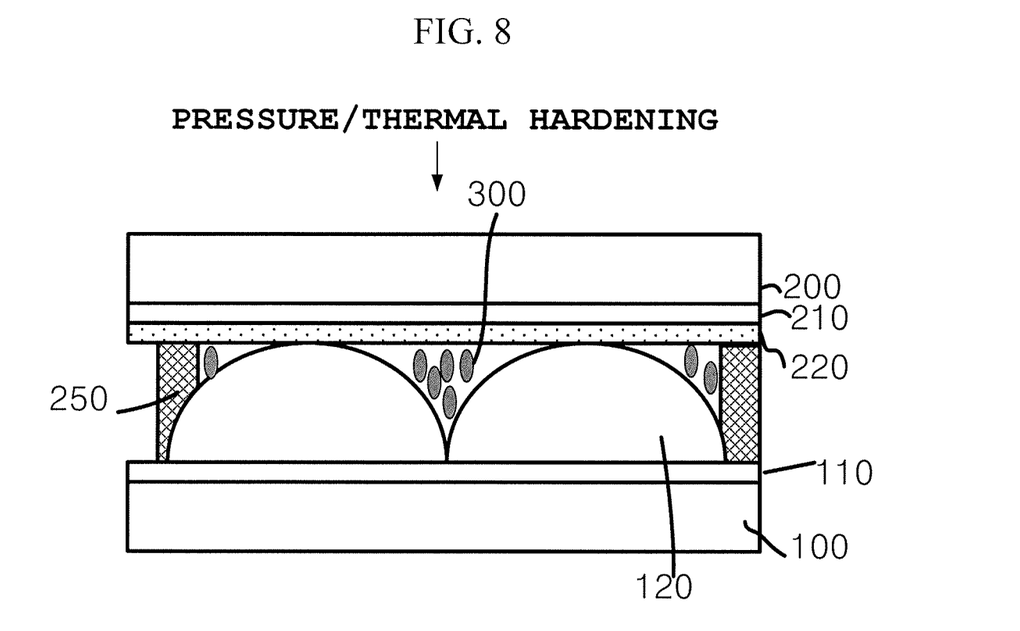
FIG. 8 is a view showing a process of laminating the lower substrate and the upper substrate of the polarization control panel according to the present invention.
Figure 9:
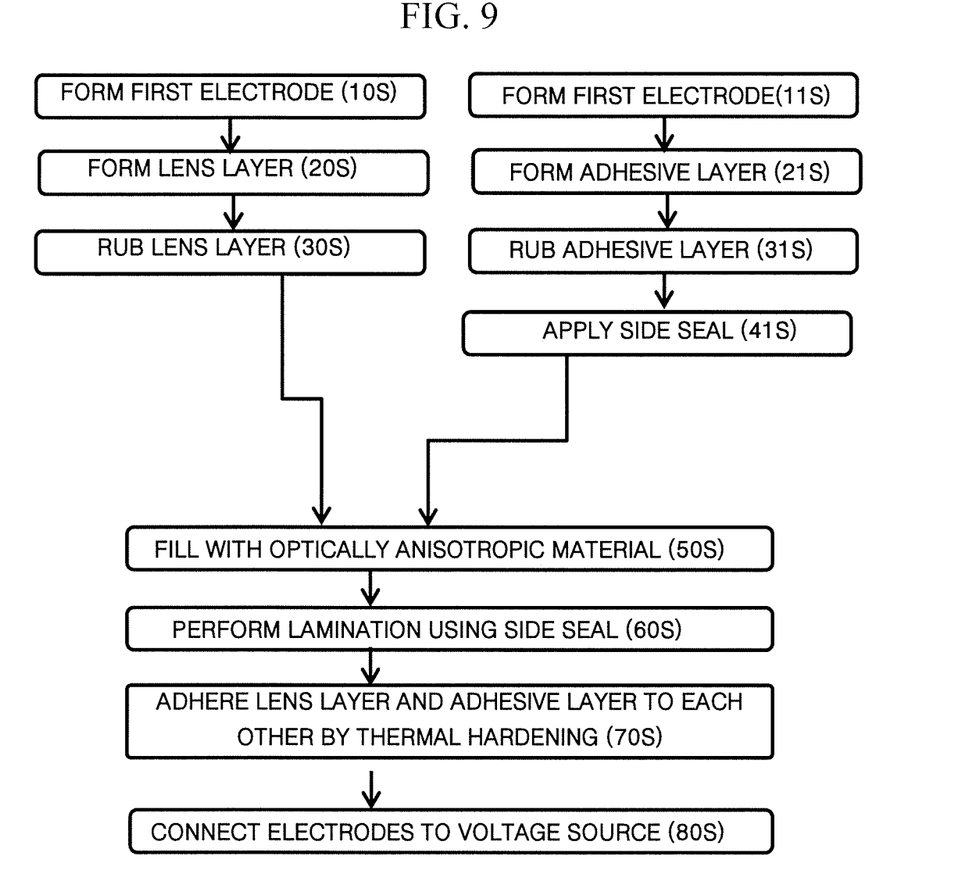
FIG. 9 is a process flowchart showing a method of forming the polarization control panel according to the present invention.

FIGS. 7A and 7B are drawings showing rubbing of the lower substrate side and the upper substrate side of the polarization control panel. FIG. 8 is a view showing a process of laminating the lower substrate and the upper substrate of the polarization control panel. FIG. 9 is a process flowchart showing a method of forming the polarization control panel according to an embodiment of the present invention.

First, a first electrode 110 is formed on a first substrate 100 (10S).

Subsequently, a lens layer 120 having a curved surface having a convex lens shape or a concave lens shape is formed on the first electrode 110 (20S).

Subsequently, the lens layer 120 is pre-baked at a temperature of about 60° C. to 70° C., and then the surface of the lens layer 120 is rubbed in a first direction, as shown in FIG. 7A (30S). Since the surface of the lens layer 120 is curved, the rubbing process may be repeated several times.

Meanwhile, a second electrode 210 and a side seal 250 are sequentially formed on a second substrate 200 in parallel when the first electrode and the lens layer that are sequentially formed on the first substrate 100.

That is, a second electrode 210 is formed on a second substrate 200 (11S), and then an adhesive layer 220 is applied to the second electrode 210 (21S). As previously described, the adhesive layer 220 may mainly include an acrylic-based polymer or an acrylic-based and epoxy-based polymer.

Subsequently, the adhesive layer 220 is pre-baked at a temperature of 60° C. to 70° C., and then the surface of the adhesive layer 220 is rubbed in a second direction, which is anti-parallel to the direction in which the lens layer 120 is rubbed, as shown in FIG. 7B (31S).

Subsequently, a closed-loop shape side seal 250 is formed in the region surrounding an active area AA, which is an edge of the second electrode 210 (41S).

Subsequently, an optically anisotropic material is dropped on the lens layer 120 so as to be filled in valleys between lenses of the lens layer 120 (50S). If the optically anisotropic material is of a liquid type, the optically anisotropic material will be naturally filled between lenses of the lens layer 120 over time. If the optically anisotropic material is a nano liquid crystal type liquid crystal layer including nano liquid crystal capsules and a binder filled among the nano liquid crystal capsules, the optically anisotropic material is applied to the lens layer 120 before the binder is hardened, and then a phase separation or hardening process using light or heat is performed such that the nano liquid crystals are filled in the valleys between lenses of the lens layer 120. In addition, the optically anisotropic material may be further provided on the lens layer 120 so as to have a predetermined thickness at the time when the optically anisotropic material is filled in the valleys in the lens layer 120. In this case, the maximum thickness of the optically anisotropic layer 300 is greater than the maximum thickness of the lens layer 120.

After the optically anisotropic layer is formed, as shown in FIG. 8, the second substrate 200 is reversed, and heat is applied in the state in which the adhesive layer 220 is in contact with the lens layer 120 so as to laminate the first and second substrates 100 and 200 (60S). During the lamination process, the adhesive layer 220 actually contacts the uppermost part of the lens layer 120. The uppermost part and the periphery of the lens layer may come into surface contact with the adhesive layer 220 due to the weight of the second substrates 200 and the components on the second substrates 200 or by the application of additional pressure. In addition, the side seal 250 may be disposed around the adhesive layer 220, and the first electrode 110 or the lens layer 120 may be opposite to the side seal 250.

Heat may be applied simultaneously during the lamination process is performed, or a baking process may be performed at a temperature of 70° C. to 80° C. for 4 to 48 hours after the lamination process is performed so as to improve adhesion between the adhesive layer 220 and the lens layer 120 and between the side seal 250 and the first electrode or the lens layer 120 (70S).

Subsequently, portions of the outer regions of the first and second electrodes 110 and 210 are connected to a FPC such that the first and second electrodes are connected to a voltage source provided in the FPC (80S). After the first and second electrodes 110 and 210 are connected to the voltage source, selective control between the 2D display mode and the 3D display mode is possible.

As described above, the alignments of the lens layer 120 and the adhesive layer 220 are defined by rubbing. According to circumstances, however, the initial alignment direction may be defined based on optical alignment. In addition, the initial alignment direction of the optically anisotropic layer may be defined through the polarization control panel 1000, the initial alignment direction of which has been defined, such that the polarization control panel serves as a transparent film in the 2D display mode and performs polarization control without light leakage in the 3D display mode.

Meanwhile, the polarization control panel is attached to the display panel to display a stereoscopic image.

Figure 10:
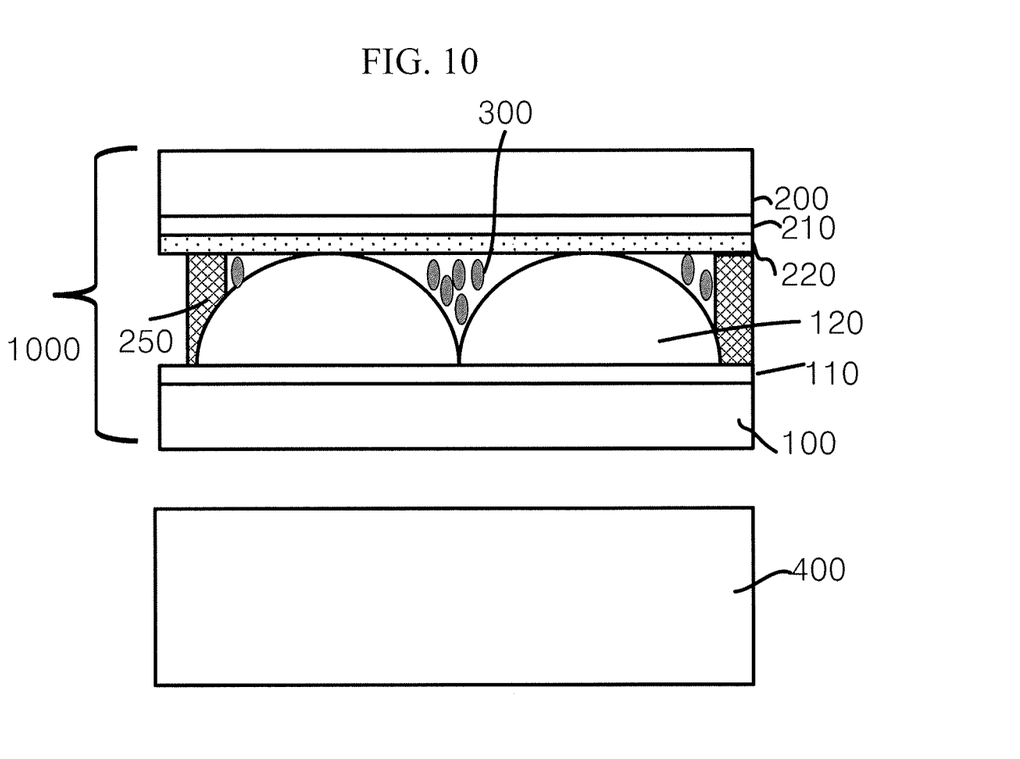
FIG. 10 is a sectional view showing a stereoscopic display device according to the present invention.

FIG. 10 is a sectional view showing a stereoscopic display device according to the present invention.

As shown in FIG. 10, the stereoscopic display device according to the present invention includes a display panel 400 for displaying an image and a polarization control panel 1000. The polarization control panel 1000 of FIG. 10 may be the polarization control panel according to the first embodiment or the second embodiment. Alternatively, the polarization control panel according to the first embodiment or the second embodiment may be reversed so as to be used as the polarization control panel 1000 of FIG. 10.

The polarization control panel 1000 may be flexible and thus may serve as a film. The polarization control panel 1000 may be attached to the display panel 400 such that the polarization control panel 1000 functions as a transparent film in the 2D display mode. In the 3D display mode, the polarization control panel 1000 refracts an image emitted through the display panel 400 in different directions with respect to the left eye and the right eye to realize a 3D image based on binocular disparity in the 3D display mode. As previously described, it is possible to switch between the 2D display mode and the 3D display mode based on whether or not a voltage is applied.

An adhesion layer may be provided between the display panel 400 and the polarization control panel 1000.

The stereoscopic display device according to the present invention is a non-glasses type display device. Specifically, a film type polarization control panel is stacked on the display panel such that a 2D display mode and a 3D display mode can be selectively executed by a switching operation therebetween, instead of using polarizing glasses having a function for dividing an image into a left-eye image and a right-eye image.

The display panel 400 selectively displays an image in the 2D display mode and in the 3D display mode. In the 2D display mode, the display panel 400 displays a 2D image. In the 3D display mode, the display panel 400 alternately displays a left-eye image and a right-eye image within a single screen.

The display panel 400 may be a liquid crystal display panel, an organic light emitting display panel, a plasma display panel, a field emission display panel, or a quantum dot display panel. For the liquid crystal display panel, a light source, such as a backlight unit, is disposed under the liquid crystal display panel to transmit light to the liquid crystal display panel. For the other kinds of display panel, on the other hand, a light emitting device is provided in each panel, and an additional light source may be omitted.

For example, if the display panel 400 is a liquid crystal display panel, the display panel 400 may include first and second substrates opposite to each other, a liquid crystal layer disposed between the first and second substrates, and first and second polarization plates disposed on the rear surface of the first and second substrates respectively. An array including a thin film transistor for controlling operation per pixel and a color filter per pixel is provided on the first substrate or the second substrate facing the liquid crystal layer.

If the display panel 400 is an organic light emitting display panel, on the other hand, a thin film transistor array including a thin film transistor per pixel is provided on a substrate, an organic light emitting diode having an organic film including first and second electrodes and a light emitting layer disposed therebetween is formed on the thin film transistor array, and a barrier for protecting the thin film transistor array and the organic light emitting diode and for preventing permeation of external moisture is provided. A polarization plate for preventing external light from being viewed is located on the barrier.

If the polarization plate is provided at the uppermost surface of the display panel 400, the polarization control panel 1000 is located on the polarization plate. If an optical film, such as the polarization plate, is not provided, the polarization control panel 1000 will be located on the uppermost surface of the display panel 400.

In this case, the first and second substrates 100 and 200 of the polarization control panel 1000 each have a uniaxial refractive index and extend in the uniaxial direction. In this instance, the display panel 400 is aligned with a transmission axis of the polarization plate located on the uppermost surface thereof.

In the polarization control panel according to the present invention described above, no additional alignment film is provided, and a rubbing process is performed on the adhesive layer and the lens layer, which are the uppermost surfaces of the first and second substrates so as to align the optically anisotropic layer. Consequently, since the process of forming the alignment film and the use of a material for the alignment film may be omitted, it is possible to simplify the process of manufacturing the polarization control panel and minimize the use of the material for the alignment film.

In addition, the adhesive layer is provided on the second substrate having the lens layer and the second electrode, such that the components of the first substrate are adhered to the components of the second substrate via the adhesive layer. In particular, the adhesion between the lens layer having the curved surface and the adhesive layer is improved, whereby it is possible to prevent delamination between the first and second substrates. In particular, it is possible to achieve higher functional stability than that of a structure in which separation frequently occurs when in use due to the mobility of the optically anisotropic layer.

Since adhesive layer is provided on the entire surface of the substrate opposite to the lens layer, a high level of adhesion is achieved, and leakage of the optically anisotropic layer material is prevented. In particular, by additionally providing the side seal, which is adjacent to the adhesive layer, at the edge of the substrate, the flow of the optically anisotropic layer, which is mainly made of a liquid material, can be prevented and the functional stability of the polarization control panel may be improved.

In addition, in the polarization control panel according to the present invention, the adhesion between the lens layer and the optically anisotropic layer may be improved, and the alignment of the optically anisotropic layer may be controlled. In the well-known structures in the related art, an alignment film is rubbed to control the alignment thereof. In the present invention, the lens layer and the adhesive layer are rubbed to align the lens layer and the adhesive layer. Consequently, the process of forming the alignment film may be omitted, and the process of manufacturing the polarization control panel may be simplified while minimizing the use of material.

Meanwhile, in the polarization control panel according to the present invention and the stereoscopic display device using the same, flexible materials are used in order to make it easy to form films and to define alignment directions.

As is apparent from the above description, the polarization control panel according to the present invention, the method of manufacturing the same, and the stereoscopic display device using the same have the following effects.

First, no alignment film is additionally provided in the polarization control panel, and the adhesive layer and the lens layer are rubbed so as to align the optically anisotropic layer. Consequently, the process of forming the alignment film and the use of a material for the alignment film are obviated, whereby the process of manufacturing the polarization control panel is simplified while minimizing the use of material.

Second, the adhesive layer is provided on the entire surface of the substrate opposite to the lens layer to achieve a high level of adhesion, and leakage of the optically anisotropic layer material is prevented. In particular, the side seal, which is adjacent to the adhesive layer, is further provided at the edge of the substrate so as to prevent the flow of the optically anisotropic layer, which is mainly made of a liquid material, and the functional stability of the polarization control panel is improved.

Third, the adhesion between the lens layer and the optically anisotropic layer is improved, and the alignment of the optically anisotropic layer can be controlled.

Fourth, flexible materials are used to make it easy to form films and to define alignment directions.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A polarization control panel comprising:
   a first substrate and a second substrate opposite to each other;
   a first electrode disposed on the first substrate and a second electrode disposed on the second substrate;
   a lens layer disposed on the first electrode, the lens layer having a surface curved toward the second electrode, the curved surface being rubbed in a first direction;
   an adhesive layer disposed on the second electrode, the adhesive layer being rubbed in a second direction, and the adhesive layer being longitudinally attached to an uppermost part of the lens layer; and
   an optically anisotropic layer disposed between the adhesive layer and the lens layer,
   wherein the optically anisotropic layer has a major-axis refractive index (ne) and a minor-axis refractive index (no),
   wherein a refractive index of the lens layer is equal to the major-axis refractive index (ne) of the optically anisotropic layer when no voltages are applied to the first and second electrodes,
   wherein a refractive index of the adhesive layer is about the same as the refractive index of the lens layer,
   wherein the adhesive layer is provided on the entire surface of the second substrate opposite to the lens layer, and
   wherein the curved surface of the lens layer is pressed and then partially contacts the adhesive layer.

2. The polarization control panel according to claim 1, wherein the lens layer is made of a photo-curable resin.

3. The polarization control panel according to claim 1, wherein
   the first substrate and the second substrate have an active area, and
   the polarization control panel further comprises a closed-loop shaped side seal disposed between the first electrode and the adhesive layer and enclosing the active area.

4. The polarization control panel according to claim 3, wherein the closed-loop shaped side seal is in contact with the first electrode and the adhesive layer.

5. The polarization control panel according to claim 3, wherein the closed-loop shaped side seal overlaps with a part of the lens layer and directly contacts an upper surface of the part of the lens layer.

6. The polarization control panel according to claim 1, wherein the curved surface of the lens layer has a convex lens shape facing the adhesive layer from the first electrode or a concave lens shape facing the first electrode from the adhesive layer.

7. The polarization control panel according to claim 1, wherein the first direction and the second direction are not parallel to each other.

8. The polarization control panel according to claim 1, wherein the optically anisotropic layer comprises liquid crystals or reactive mesogen.

9. The polarization control panel according to claim 1, wherein the adhesive layer comprises an acrylic polymer.

10. The polarization control panel according to claim 9, wherein the adhesive layer comprises an epoxy polymer.

11. The polarization control panel according to claim 9, wherein the adhesive layer has the refractive index of 1.48 to 1.68.

12. The polarization control panel according to claim 3, wherein the adhesive layer is disposed on the second electrode in the active area, and
   wherein the uppermost part of the lens layer has a predetermined thickness and the adhesion layer has surface-to-surface adhesion with the uppermost part of the lens layer.

13. The polarization control panel according to claim 1, wherein the lens layer is tilted with respect to a vertical direction of the first substrate.

14. The polarization control panel according to claim 1, wherein the polarization control panel lacks an orientation film based on the adhesive layer being rubbed in the second direction.

15. A method of manufacturing a polarization control panel, the method comprising:
   providing a first electrode on a first substrate;
   forming a lens layer having a regularly curved surface on the first electrode;
   rubbing a surface of the lens layer in a first direction;
   providing a second electrode on a second substrate;
   forming an adhesive layer on the second electrode;
   rubbing the adhesive layer in a second direction;
   forming a closed-loop shaped side seal on the adhesive layer so as to enclose an edge of an active area;
   forming an optically anisotropic layer among lenses of the lens layer; and
   laminating the first substrate and the second substrate via the closed-loop shaped side seal such that the adhesive layer and the lens layer face each other and the adhesive layer longitudinally attaches the lens layer,
   wherein the optically anisotropic layer has a major-axis refractive index (ne) and a minor-axis refractive index (no),
   wherein a refractive index of the lens layer is equal to the major-axis refractive index (ne) of the optically anisotropic layer when no voltages are applied to the first and second electrodes,
   wherein a refractive index of the adhesive layer is about the same as the refractive index of the lens layer,
   wherein the adhesive layer is provided on the entire surface of the second substrate opposite to the lens layer, and
   wherein the regularly curved surface of the lens layer is pressed and then partially contacts the adhesive layer.

16. The method according to claim 15, wherein the laminating comprises baking the adhesive layer and the lens layer at a temperature of 70° C. to 80° C. for 4 to 48 hours to adhere facing surfaces of the adhesive layer and the lens layer to each other.

17. A stereoscopic display device comprising:
   a polarization control panel including:
   a first substrate and a second substrate opposite to each other,
   a first electrode disposed on the first substrate and a second electrode disposed on the second substrate,
   a lens layer provided on the first electrode, the lens layer having a surface curved toward the second electrode, the curved surface being rubbed in a first direction,
   an adhesive layer provided on the second electrode, the adhesive layer being rubbed in a second direction, and the adhesive layer being longitudinally attached to an uppermost part of the lens layer, and
   an optically anisotropic layer disposed between the adhesive layer and the lens layer; and
   a display panel provided on one side of the polarization control panel, wherein the optically anisotropic layer has a major-axis refractive index (ne) and a minor-axis refractive index (no), wherein a refractive index of the lens layer is equal to the major-axis refractive index (ne) of the optically anisotropic layer when no voltages are applied to the first and second electrodes, wherein a refractive index of the adhesive layer is about the same as the refractive index of the lens layer, wherein the adhesive layer is provided on the entire surface of the second substrate opposite to the lens layer, and wherein the curved surface of the lens layer is pressed and then partially contacts the adhesive layer.

18. The stereoscopic display device according to claim 17, wherein
the first substrate and the second substrate have an active area, and
the polarization control panel further comprises a closed-loop shaped side seal enclosing the active area and disposed between the first electrode and the adhesive layer.

19. The stereoscopic display device according to claim 18, wherein the closed-loop shaped side seal is in contact with the first electrode and the adhesive layer.

20. The stereoscopic display device according to claim 17, wherein the curved surface of the lens layer has a convex lens shape facing the adhesive layer from the first electrode or a concave lens shape facing the first electrode from the adhesive layer.

21. The stereoscopic display device according to claim 17, wherein the adhesive layer is disposed on the second electrode in the active area, and
wherein the uppermost part of the lens layer has a predetermined thickness and the adhesion layer has surface-to-surface adhesion with the uppermost part of the lens layer.

22. The stereoscopic display device according to claim 17, wherein the optically anisotropic layer contacts the adhesive layer among apexes of the curved surface of the lens layer in a same plane to the apexes of the curved surface of the lens layer.

23. The stereoscopic display device according to claim 17, wherein an initial orientation of the optically anisotropic layer is secured by the first direction rubbed in the lens layer and the second direction rubbed in the adhesive layer.

24. The stereoscopic display device according to claim 17, wherein a first rubbing of the lens layer and a second rubbing of the adhesive layer meet each other at a contact area between the lens layer and the adhesive layer.

* * * * *